US008468444B2

(12) United States Patent
Middelfart (10) Patent No.: US 8,468,444 B2
(45) Date of Patent: Jun. 18, 2013

(54) HYPER RELATED OLAP

(75) Inventor: Morten Middelfart, Hjørring (DK)

(73) Assignee: Targit A/S, Hjorring (DK)

( * ) Notice: Subject to any disclaimer, the term of this patent is extended or adjusted under 35 U.S.C. 154(b) by 0 days.

(21) Appl. No.: 10/802,509

(22) Filed: Mar. 17, 2004

(65) Prior Publication Data
US 2005/0210389 A1    Sep. 22, 2005

(51) Int. Cl.
*G06F 15/00*      (2006.01)
(52) U.S. Cl.
USPC .......................................... 715/234; 715/243
(58) Field of Classification Search
USPC ........................ 715/500.1, 513, 517
See application file for complete search history.

(56) References Cited

U.S. PATENT DOCUMENTS

| | | | |
|---|---|---|---|
| 4,800,510 A | | 1/1989 | Vinberg et al. |
| 5,611,034 A | | 3/1997 | Makita |
| 5,692,181 A | * | 11/1997 | Anand et al. ................ 707/102 |
| 5,884,302 A | | 3/1999 | Ho |
| 5,911,138 A | | 6/1999 | Li et al. |
| 5,940,818 A | | 8/1999 | Malloy et al. |
| 6,108,657 A | | 8/2000 | Shoup et al. |
| 6,160,549 A | | 12/2000 | Touma et al. |
| 6,226,647 B1 | | 5/2001 | Venkatasubramanian et al. |
| 6,415,298 B1 | | 7/2002 | Oesterer et al. |
| 6,418,441 B1 | | 7/2002 | Call |
| 6,484,179 B1 | | 11/2002 | Roccaforte |
| 6,490,590 B1 | | 12/2002 | Fink |
| 6,615,172 B1 | | 9/2003 | Bennett et al. |
| 6,625,617 B2 | * | 9/2003 | Yarnall et al. ............. 707/104.1 |
| 6,643,635 B2 | | 11/2003 | Nwabueze |
| 6,647,363 B2 | | 11/2003 | Claassen |
| 6,671,689 B2 | * | 12/2003 | Papierniak ................... 707/100 |
| 6,707,454 B1 | | 3/2004 | Barg et al. |
| 6,775,675 B1 | | 8/2004 | Nwabueze et al. |
| 6,816,879 B1 | | 11/2004 | Kiritzov et al. |

(Continued)

FOREIGN PATENT DOCUMENTS

| | | |
|---|---|---|
| EP | 0 961 439 | 12/1999 |
| EP | 1 081 610 A2 | 3/2001 |

(Continued)

OTHER PUBLICATIONS

Targit, Targit Analysis 2K3 Technical White paper, Jul. 2003, Targit, Version: 1.2, pp. 1-19.*

(Continued)

*Primary Examiner* — Nathan Hillery
(74) *Attorney, Agent, or Firm* — Buchanan Ingersoll & Rooney PC (57) ABSTRACT

Generating a presentation requested from a graphical data report; comprising: displaying a data report which contains a collection of graphical elements, where a graphical element is bound to a data item, and where a data item is specified by metadata, which comprises one or more of a dimension, a dimension value, and a measure. In response to a user's directed action to the given graphical element, determining at least one association, of a dimension and a measure, by identification of measures and dimensions in the applicable metadata and identification of associations thereof and/or addition of a dimension or measure to an identified measure or dimension. Subsequently, searching for a stored, like association, where stored associations are related to stored presentation properties, and applying the related presentation properties to make a presentation of further data items which are specified by the determined, at least one association.

18 Claims, 6 Drawing Sheets

U.S. PATENT DOCUMENTS

| | | | |
|---|---|---|---|
| 6,873,993 | B2 | 3/2005 | Charlesworth et al. |
| 6,889,230 | B1 | 5/2005 | Rogers |
| 7,010,523 | B2 | 3/2006 | Greenfield et al. |
| 7,051,038 | B1* | 5/2006 | Yeh et al. ............... 707/102 |
| 7,073,125 | B1 | 7/2006 | Nystrom et al. |
| 7,103,591 | B2 | 9/2006 | Asobayire et al. |
| 7,170,519 | B2 | 1/2007 | Patel et al. |
| 7,171,335 | B2 | 1/2007 | Liu et al. |
| 7,209,876 | B2 | 4/2007 | Miller et al. |
| 7,293,031 | B1 | 11/2007 | Dusker et al. |
| 7,667,582 | B1 | 2/2010 | Waldorf |
| 2001/0013004 | A1* | 8/2001 | Haris et al. ............... 705/1 |
| 2002/0038230 | A1 | 3/2002 | Chen |
| 2002/0059183 | A1 | 5/2002 | Chen |
| 2002/0059195 | A1* | 5/2002 | Cras et al. ............... 707/3 |
| 2002/0062290 | A1 | 5/2002 | Ricci |
| 2002/0070953 | A1* | 6/2002 | Barg et al. ............... 345/700 |
| 2002/0087516 | A1* | 7/2002 | Cras et al. ............... 707/2 |
| 2002/0091681 | A1* | 7/2002 | Cras et al. ............... 707/3 |
| 2002/0129004 | A1 | 9/2002 | Bassett et al. |
| 2002/0156714 | A1 | 10/2002 | Gatto |
| 2002/0184024 | A1 | 12/2002 | Rorex |
| 2003/0009295 | A1* | 1/2003 | Markowitz et al. ............... 702/20 |
| 2003/0016248 | A1 | 1/2003 | Hayes Ubillos |
| 2003/0050825 | A1* | 3/2003 | Gallivan et al. ............... 705/10 |
| 2003/0061096 | A1* | 3/2003 | Gallivan et al. ............... 705/14 |
| 2003/0061358 | A1* | 3/2003 | Piazza et al. ............... 709/227 |
| 2003/0071814 | A1 | 4/2003 | Jou et al. |
| 2003/0088564 | A1 | 5/2003 | Lohmann et al. |
| 2003/0101119 | A1* | 5/2003 | Parsons et al. ............... 705/36 |
| 2003/0120593 | A1 | 6/2003 | Bansal et al. |
| 2003/0126136 | A1 | 7/2003 | Omoigui |
| 2003/0158795 | A1 | 8/2003 | Markham et al. |
| 2003/0193502 | A1 | 10/2003 | Patel et al. |
| 2004/0001106 | A1 | 1/2004 | Deutcher et al. |
| 2004/0015595 | A1 | 1/2004 | Lin et al. |
| 2004/0039707 | A9 | 2/2004 | Ricci |
| 2004/0059705 | A1 | 3/2004 | Wittke et al. |
| 2004/0083425 | A1 | 4/2004 | Dorwart |
| 2004/0193576 | A1 | 9/2004 | Petculescu et al. |
| 2004/0230585 | A1 | 11/2004 | Middelfart |
| 2005/0060300 | A1 | 3/2005 | Stolte et al. |
| 2005/0071737 | A1 | 3/2005 | Adendorff et al. |
| 2005/0076045 | A1* | 4/2005 | Stenslet et al. ............... 707/101 |
| 2005/0192931 | A1 | 9/2005 | Rogers |
| 2005/0198042 | A1 | 9/2005 | Davis |
| 2005/0223093 | A1 | 10/2005 | Hanson et al. |
| 2006/0010164 | A1 | 1/2006 | Netz et al. |
| 2006/0085434 | A1 | 4/2006 | Mah et al. |
| 2006/0106843 | A1 | 5/2006 | Middelfart et al. |
| 2006/0149407 | A1 | 7/2006 | Markham et al. |
| 2007/0174262 | A1 | 7/2007 | Middelfart |
| 2007/0294612 | A1 | 12/2007 | Drucker et al. |
| 2008/0016035 | A1 | 1/2008 | Middelfart |
| 2008/0301539 | A1 | 12/2008 | Middelfart et al. |
| 2009/0187845 | A1 | 7/2009 | Middelfart |

FOREIGN PATENT DOCUMENTS

| | | |
|---|---|---|
| EP | 1 081 611 A2 | 3/2001 |
| EP | 1 477 909 A1 | 11/2004 |
| EP | 1 574 969 A1 | 9/2005 |
| EP | 1 577 808 A1 | 9/2005 |
| EP | 1 659 503 A1 | 5/2006 |
| WO | WO 82/00726 | 3/1982 |
| WO | WO 97/08604 A2 | 3/1997 |
| WO | WO 01/09780 A1 | 2/2001 |
| WO | WO 01/35256 A2 | 5/2001 |
| WO | WO 01/82135 A1 | 11/2001 |
| WO | WO 2004/102416 A2 | 11/2004 |

OTHER PUBLICATIONS

Pedersen et al., Achieving Adaptivity for OLAP-XML Federations, Nov. 7, 2003, DOLAP '03, pp. 25-32.*

Targit, Targit Products & Services, Sep. 23, 2002, Targit, pp. 1-6.*

Abualsamid, Ahmad. "PHP & Hosted Applications: A flexible scripting language for building dynamic web pages," *Dr. Dobb's Journal* (2001), 26(1): 56, 58, 60-63.

Spiers, Andrew, "Creating Dynamic WBMP images using PHP", WMLScript.com, (Jan. 13, 2001) pp. 1-3.

Royappa, Andrew V. "The PHP Web Application Server" *Journal of Computing in Small Colleges* (2000), 15(3): 201-211.

"L" interface avec une base de données, Université Paris, (Oct. 18, 2000), pp. 1-4, Retrieved from http://web.archive.org/web/20001018225046.

*Internet Archive Wayback Machine* Search Results for "http://margotte.univ.Parisl.fr/webcurse/html sql.html", Oct. 18, 2000. Retrieved from http://web.archive.org/web.

"Les bases de données relationnelles, Chapitre 25: les échanges de données," (Jan. 2, 2003), pp. 1-6. Retrieved from http://cerig.efpg.inpg.fr/turoriel/bases-de-donness/chap25.htm.

"Importer Et Exporter Avec Excel, Source No. 3673," *Visual Basic Code Sources*, (Jun. 19, 2002) pp. 1-2. Retrieved from http://www.vbfrance.com/code.aspx?ID =3673.

Notice of Allowance dated Aug. 12, 2009 from related U.S. Appl. No. 10/556,214.

Notice of Allowance dated Sep. 8, 2009 from related U.S. Appl. No. 10/991,302.

Perez, J. M. et al. "A Relevance-Extended Multi-Dimensional Model for a Data Warehouse Contextualized with Documents" DOLAP (2005) p. 19-28.

Form PCT/ISA/210 (International Search Report) dated Dec. 5, 2007, issued in corresponding International Application PCT/DK2007/000232.

Form PCT/ISA/237 (Written Opinion of the International Searching Authority) dated Dec. 5, 2007 issued in corresponding International Application PCT/DK2007/000232.

B. Azvine et al., "Intelligent Process Analytics for CRM", BT Technology Journal, Jan. 2006, vol. 24, No. 1, pp. 60-69, XP-019392378, Kluwer Academic Publishers.

Pawan Chowdhary et al., "Enterprise Integration and Monitoring Solution Using Active Shared Space", Proceedings of the 2005 IEEE International Conference on e-Business Engineering (ICEBE'05), Oct. 12, 2005, pp. 665-672, XP-010860530, The Compute Society.

Russell Barr et al., "Real Time Modeling for Financial and Performance Management", Cement Industry Technical Conference, IEEE, May 15-20, 2005, pp. 43-51, XP-010840065.

Form PCT/ISA/210 (International Search Report) dated Nov. 11, 2004, issued in corresponding International Application PCTDK2004000347.

Michelle X. Zhou & Sheng Ma, "Representing and Retrieving Visual Presentations for Example-Based Graphics Generation," Proceedings, 1st International Symposium on Smart Graphics, Hawthorne, NY, USA (Mar. 21-23, 2001), pp. 87-94.

Aloia, N., "Design of Multimedia Semantic Presentation Templates: Options, Problems and Criteria of Use." Proceedings of the Working Conference on Advanced Visual Interfaces, ACM Press (1998) pp. 205-215.

Mackinlay, J., "Automating the Design of Graphical Presentations of Relational Information" ACM Transactions on Graphics (vol. 5) (No. 2) (1986) pp. 110-141.

Office Action dated Jun. 15, 2009 from related U.S. Appl. No. 11/509,832.

Office Action dated Sep. 19, 2008 from related U.S. Appl. No. 11/509,832.

Office Action dated Feb. 5, 2008 from related U.S. Appl. No. 10/991,302.

Office Action dated Jun. 22, 2007 from related U.S. Appl. No. 10/991,302.

Office Action dated Jun. 22, 2009 from related U.S. Appl. No. 10/991,302.

Office Action dated Oct. 2, 2008 from related U.S. Appl. No. 10/991,302.

Office Action dated Mar. 20, 2007 from related U.S. Appl. No. 10/449,811.

Office Action dated May 4, 2009 from related U.S. Appl. No. 10/449,811.

Office Action dated Jul. 18, 2006 from related U.S. Appl. No. 10/449,811.

Office Action dated Sep. 15, 2008 from related U.S. Appl. No. 10/449,811.

Office Action dated Nov. 10, 2005 from related U.S. Appl. No. 10/449,811.
Office Action mailed Dec. 18, 2007 from related U.S. Appl. No. 10/449,811.
Office Action mailed Sep. 23, 2008 from related U.S. Appl. No. 10/556,214.
Office Action dated Dec. 21, 2007 from related U.S. Appl. No. 10/556,214.
EP Search Report dated Dec. 18, 2008 from EP Application No. 07 38 8055 corresponding to U.S. Appl. No. 11/509,832.
Becks, A., "Sewasie—Specification of the Interface Design" XP002300607, Retrieved from the Internet: URL: http://www.sewasie.org/documents/D-4-4-interface-design.pdf> [retrieved on Oct. 13, 2004].
W. Cody et al., "The Integration of Business Intelligence and Knowledge Management" XP002300608, Retrieved from the Internet: URL: http://www.research.ibm.com/journal/sj/414/cody.pdf> [retrieved on Oct. 13, 2004].
Becks, a., "Sewasie—Specification of the Architecture of the Monitoring Agent/Visualization Component" XP002300606, Retrieved from the Internet: URL: http://www.sewasie.org/documents/D-4-1-monitoring-agent-architecture.pdf> [retrieved on Oct. 13, 2004].
Johnson et al., History data facility in the SLC control system, May 6-9, 1991, IEEE, vol. 3, 1540-1542.
Priebe et al., Ontology-based integration of OLAP and information retrieval, Sep. 1-5, 2003, IEEE, 610-614.
Office Action dated Dec. 8, 2009 from related U.S. Appl. No. 11/509,832.
Communication dated Mar. 6, 2009 from related EP Application No. 04 388 077.2 corresponding to U.S. Appl. No. 10/991,302.
Communication dated Sep. 2, 2008 from EP Application No. 08 15 5432 corresponding to U.S. Appl. No. 12/112,178.
"MicroStrategy Introduces Next-Generation Dynamic Enterprise Dashboards" Thomasnet Industrial Newsroom, [Online] Jan. 22, 2007, XP002491679 Retrieved from the Internet: URL:http://news.thomasnet.com/fullstory/802157> [retrieved on Feb. 25, 2010].
TECHNOLOGIES4TARGETING Ltd.: "Cognos Visualizer—Corporate dashboards that give managers insight to make better decisions" Internet Article, [Online] 2004, XP002491680 Retrieved from the Internet: URL:http://www.tech4t.co.uk/pages/cognos_visualizer.html> [retrieved on Feb. 25, 2010].
Chaudhuri S et al: "An Overview of Data Warehousing and OLAP Technology" SIGMOD Record, ACM, New York, NY, US, vol. 26, No. 1, Mar. 1, 1997, pp. 65-74, XP002193792 ISSN: 0163-5808.
Microstrategy Incorporated: "MicroStrategy 8 Frequently Asked Questions (FAQ)" Internet Article, [Online] 2005, XP002491681 Retrieved from the Internet: URL:http://www.firstbi.com.tw/download/8.0%20FAQ.pdf> [retrieved on Feb. 25, 2010].
Communication dated Aug. 10, 2007 from EP Application No. 04 388 077.2 corresponding to U.S. Appl. No. 10/991,302.
Communication dated Oct. 29, 2009 from EP Application No. 04 388 077.2 corresponding to U.S. Appl. No. 10/991,302.
Notice of Allowance dated Apr. 16, 2010 issued in related U.S. Appl. No. 10/449,811.
Office Action dated Aug. 10, 2010 issued in related U.S. Appl. No. 11/509,832.
Blattner, Patrick "Special Edition Using Microsoft Office Excel 2003." Que Publishing, 2004, pp. 143, 144, 170, 171, 432, 494, 495, 501-503, 699, 745-747, 753, 755, 756.
Rutledge, Patrice-Anne, et al., "Special Edition Using Microsoft Office PowerPoint 2003." Que Publishing, 2004, pp. 176, 177, 255, 261.
Office Action issued in U.S. Appl. No. 12/112,178 on Jun. 23, 2011.
Office Action issued in related U.S. Appl. No. 12/112,178 dated Jan. 4, 2012.
Office Action issued in related U.S. Appl. No. 12/300,505 dated Mar. 16, 2012.
Office Action issued in related U.S. Appl. No. 12/112,178 dated Nov. 23, 2012.

* cited by examiner

HYPER RELATED OLAP

This invention relates to a computer-implemented method of preparing a presentation requested from a data report.

BACKGROUND

Data processing techniques for analytical purposes are, contrary to data processing for transaction purposes, optimized with respect to providing a user with processors and presentation tools that can generate illustrations of the result of a specified analysis task.

Not only the data processing techniques, but also the data on which the analysis is to be based are often arranged with the special aim of supporting analysis purposes. This means that data are organised in a straight forward or flat organisation. This straight forward organisation of the data requires, however, a higher memory consumption and longer access time to the data when compared to organisation of data for transaction purposes. Typically, databases for analytical purposes comprise redundant data in that pre-computed aggregations of data are comprised in the database along with underlying data, ie data across which the aggregation(s) is/are performed. Thus, one can say that such a database represents data at different levels of granularity.

A well recognised organisation of data for analysis purposes comprises multidimensional databases e.g. so-called cube databases, or simply Cubes, for OLAP, OnLine Analytical Processing, databases. However, various types of databases and other types of data structures can be used for analytical processing, including relational databases, flat file databases, XML (Extensible Markup Language) databases, etc. In these databases elements of data can be denoted data items and can be defined as a field in a specific record, a cell in a table or spreadsheet, or a delimiter or tag separated or fixed-length data entity.

Despite their different structures each of the data items in the databases can be categorized as being so-called measures or dimensions. From a data representation point of view there are prima facia no differences, but from a user's point of view, a data item of the measures type can be interpreted as a measure value given a specific condition specified by an associated value of a data item of the dimensions type. A value of a data item of the dimensions type is also recognised as a so-called dimension value or a criterion.

Hence, for instance a range of data items categorized as measures can represent sales figures in an organisation. These sales figures are given a meaning when associated with the specific conditions of the time instances at which the sales figures represent the sales in the organisation. The time instances are represented by means of the dimension values. By categorizing the data items in this way an additional and more abstract way of representing data is provided; this additional representation is also denoted meta-data. In the above example, time is thus a dimension and the sales figures are categorized as a measure.

The data processing techniques for analytical purposes operate on these data whatever the organisation of the data to provide a result of the analysis. For this purpose, an analysis task can be specified by a request to a database. The result of the analysis is then illustrated by means of a data report. The data report can be set up by a user who selects presentation objects and properties thereof by of a so-called 'report generator' or a 'chart wizard', wherefrom default layout properties or user-specified layout properties are selected before making the presentation.

In connection therewith it is a well-known situation that a user often uses some sort of trial-and-error for tuning, on the one hand, the specification of the analysis task and, on the other hand, the illustration of the result of the analysis. Therefore, a further specification of the analysis task and the illustration of the results are functions which more or less have merged into the same user interface for more or less simultaneous tuning of an analysis and the results thereof.

The graphical/visual presentation of data is greatly influenced by the type of graphical/visual objects applied to make the presentation and layout properties of the graphical/visual objects. For textual presentations the objects may comprise text sections, headings, tables with columns and rows, etc. The layout properties may comprise font size, line spacing, etc. For graphical presentations the objects may comprise different types of charts and diagrams such as bar charts, line charts, pie charts, scatter charts, radar diagrams and other known diagrams or charts based on graphical elements. The layout properties may comprise tick marker spacing on an axis, legend font size, etc.

Presentation objects may be more or less suitable for making a presentation of a specific result with given contents, structure and format. Typically, the user is the only one to make a decision on that since it may require knowledge of the result which is not present in the application in which the presentation is made. However, the layout properties for specific presentation means are to some extent determined by properties of the physical medium on which the presentation is to be made. These properties are typically known to the application since knowledge of these properties is required to make the presentation. Therefore, the application can to some extent provide automatic setting of the layout properties. However, when it comes to layout properties which clearly are to be set in response to preferences of individual users and which may depend heavily on the content, structure and format of the result, it becomes critical to select a presentation automatically or semi-automatically.

In some types of applications results of a repeated analysis task have a fixed structure and format which is repeatedly presented by the same graphical/visual objects. Thereby, it may be worth the effort to spend time on selecting an optimal presentation object and tuning the layout thereof to obtain an optimal presentation in terms of obtaining the clearest presentation. An optimal presentation quality is thereby obtained.

However, in other types of applications the structure and format of the result of repeated analyses may change. Thereby it may be an overwhelming task to spend time on applying some sort of trial-and-error to obtain an optimal presentation for each result.

Especially in connection with presentation of results obtained by submitting a query to a database, the query to the database may generate results that can assume so many different structures and formats that it may be practically impossible to capture all the combinations of a result for making an automatic or semi-automatic presentation.

The ever increasing data capacity of storage memories and the widespread use of databases increase the amount of time a user is confronted with in connection with the task of, on the one hand, making queries to databases; and on the other hand, selecting a presentation for the data retrieved by the query.

PRIOR ART

It is known to provide a user with tools for making a so-called data 'drill-down'. One familiar with field of databases will know the term 'drill-down' to comprise a method of coming from a data report with aggregated data to underlying data across which aggregation is performed to render the aggregated data and to make a presentation of the underlying data. Thus one may drill down from data at a coarse scale to data at a fine scale and make a presentation of the data at the fine scale.

This reflects, on the one hand, that a user is provided with a tool for limited tuning of an analysis and the result thereof. On the other hand, this tuning is limited to populating the presentation with details. This involves the problem that only limited data processing capabilities are exploited. When a user desires to explore a given figure in more detail he/she is loaded with a large amount of details data that may not provide information useful for really exploring the figure in a clear way.

U.S. Pat. No. 5,611,034 discloses a method of making a graph by selecting one of a plurality of graph forms that are automatically determined to fit a user's data format. Thereby graph forms that are deduced to be inappropriate for displaying selected data can be filtered out to make a list of appropriate graphs. For instance the method can filter out a pie chart if a user's data format involves several rows and columns. However, this method is only involved with deductions that are based on low level, logic deductions.

WO 82/00726 discloses a mechanism for generating graphic charts based on a user interface wherefrom a user can create new charts or recall previously created charts. The mechanism involves a selector mechanism which co-operates with the user interface to provide a set of interdependent and sequential menus which in combination provides guidance for the user in the process of composing a chart. The chart is created in a user-selected input mode from user selected chart objects and descriptors of the chart objects. Hence, the user is provided with a wizard-like guidance wherefrom also previously created charts may be selected and recalled. The user however, must struggle to remember which chart to select and recall.

U.S. Pat. No. 6,160,549 discloses a report generator that uses a graphical user interface to facilitate specification of layout aspects of the report and data aspects of the report. The report generator allows the use of multiple database queries that are related to each other in a parent-child relationship in a tree hierarchy. Each node of the tree describes a layout object with layout properties and introduces a relation between the report layout and data. The layout properties are defined by a user by means of a graphical user interface. Thereby the task of procedural or declarative report programming is limited or avoided in report development. Despite being able to reuse previously specified presentation elements combined with a previously used query element when the query element is used again, it may be desired to alter the presentation element when used in a new query/presentation context. Thereby reuse of presentation element as in the original context is spoiled.

U.S. Pat. No. 4,800,510 discloses a method of controlling the process of designing the layout of a computer-generated graph by automatically adjustment of design parameters that determine the layout of the graph in response to user-selected parameters that are selected at a higher level of abstraction of the computer-generated graph. This is carried into effect by referencing each group of multiple design parameters by a single user selectable parameter.

As shown above, the prior art discloses various techniques for easing the task of setting up the layout of a presentation in the form of a graphical report or a graph. At a relatively high abstraction level the user is involved in selecting the presentation, whereas at lower abstraction levels involving more details a system automatically generates the presentation. The automatically generated presentation is generated from previously stored preferences on previous presentations or knowledge of the data or the queries that are used for retrieving the data to be presented.

However, the problem of only limited data processing capabilities being exploited and the problem of a user being overloaded with a large amount of details data when a user desires to explore a given figure of a data report in more detail remain unsolved.

SUMMARY OF THE INVENTION

The present invention overcomes these and other problems by means of a computer-implemented method of preparing a presentation requested from a data report. The method comprises the following steps of:

displaying a data report which contains a collection of graphical elements, where a graphical element is bound to a data item, and Where a data item is specified by metadata, and where the metadata comprises one or more of a dimension, a dimension value, and a measure;

in response to a user's directed action to the given graphical element, determining at least one association, of a dimension and a measure, by identification of measures and dimensions in the applicable metadata and identification of associations thereof and/or addition of a dimension or measure to an identified measure or dimension;

searching for a stored, like association, where stored associations are related to stored presentation properties, and applying the related presentation properties to make a presentation of further data items which are specified by the determined at least one association.

Thereby, a user can target the graphical element that illustrates a figure to be explored further according to his/hers presentation preferences. Thus, a very intuitive interface can be provided to the user. Since the metadata comprises a dimension and/or a measure and/or a dimension value it is possible to retrieve information for generating or identifying an association which is related to preferred presentation properties. In particular, it is convenient that the specific metadata that applies to a given data item can be determined from a graphical element that illustrates a value of the data item to there through provide a link from the graphical element, via metadata, to preferred presentation properties.

The metadata can be used for making deductions about which presentation to select when using an automatic selection procedure. From the metadata an association can be determined. When both a dimension and a measure are comprised in the metadata, the association is already established. However, when only a dimension or measure is comprised in the metadata an association involving the dimension or measure in the metadata can be created. Based on either the existing association or the created association a storage memory of presentation properties for previously used presentations can be searched and if a match is found, these presentation properties can be applied to make a presentation of data specified by the association.

Consequently, meta-knowledge of data items behind a graphical element is used for determining presentation properties. Thereby the chance of being able to retrieve presentation properties is greatly increased. Since presentation properties are searched for per association, it is possible to define presentation properties for each new combination of data items or to define several sets of presentation properties per association. Thereby the presentation of e.g. a data item 'sales' may be different depending on the association of which it is a constituent.

In a preferred embodiment of the invention, the step of making a presentation comprises a step of: making a presentation confined to a subset of the further data items, which subset is specified by the determined association and a dimension value in the applicable metadata. Thereby a criterion in the data report can be carried from the metadata, in the data report, to a request by means of which the further data items are retrieved. Thus, a figure to be explored in the data report can be explored under the same criterion in the presentation of the further data.

Preferably, the further data items are additionally specified by a dimension value; and the presentation properties are divided into a first group and a second group; and wherein properties of the first group are applied to the further data items as specified by the determined, at least one association; and wherein properties of the second group are applied to a subset of the further data items as further specified by a dimension value of the applicable metadata. The first group can comprise e.g. properties defining a type of presentation and the second group can comprise properties of a given type of presentation. Thereby the determined association determines the type of presentation whereas the dimension value or criterion defines properties in dependence of the criterion or criteria, if any.

The step of searching for a stored, like association can comprise the steps of: in case a stored, like association is not found, generating presentation properties; and relating the generated presentation properties to the determined association. Thereby presentation properties linked to a determined association can be generated for a first time based on automatic, semi-automatic or manual settings or adjustments. Thereby a system in which the method is applied can be developed based on the data the user is operating on i.e. the associations that are determined and the user's preferences for presenting the data of the association. This will provide the user with a tool that adapts to the user's preferences. This provides in turn an increased performance in terms of reducing the number of required interactions to reach a given presentation result.

The report can be configured with a tool providing a user with controls for manipulating presentation properties according to either of the following steps in response to a user's action: selecting a presentation object from a collection of presentation objects and selecting graphical properties of the selected presentation object; or changing an applied presentation object and/or selecting graphical properties of the applied presentation object. In the first situation, the user can be prompted to select a presentation, whereas in the second situation the user can modify or change a presentation object which is suggested in accordance with partial matching stored presentation properties.

Preferably, the step of searching for stored, like metadata comprises: determining whether an identified measure or dimension or association thereof can be deemed to be incomplete, and in that event searching for stored, like metadata with associated presentation properties, in which the deemed incomplete metadata are comprised. The like metadata can be applied to complete the deemed incomplete measure, dimension or association. Thereby, information for making a meaningful presentation can be retrieved. The information can comprise metadata for, in the first place, retrieving the data which are probably the data that are to be presented. Thus, small fractions of metadata can be completed to retrieve data at all.

There may not be any stored association which is identical to a determined association. In that event no use of stored presentation properties can be exploited. However, in accordance with a preferred embodiment, the step of searching for stored, like metadata can comprise: determining whether the determined association can be deemed to be different from stored associations, and in that event searching for a stored association, with related presentation properties, in which a measure or dimension of the determined association is comprised; and applying the presentation properties related to the stored association, which comprises the dimension or the measure, to make the presentation. Thereby presentation properties of a best matching association can be applied. For instance a determined association can comprise a dimension with dimension values of time instances or time intervals, and a measure of e.g. a revenue. Presentation properties related to an association in which the dimension, but not the same measure is comprised can be applied with sense despite the different measure. The different measure could be e.g. turnover, in which case 'turnover' may share a property with 'revenue' e.g. a unit of 1000$. Thereby preferred presentation properties e.g. of how to display measures of dollar amounts over time can be applied although no stored presentation properties exist for the exact same association.

The method can comprise the step of: determining multiple associations based on retrieving associations wherein a dimension identified in the applicable metadata is a constituent to thereby discover multiple measures which each forms an association in combination with the identified dimension. Thereby a single determined dimension, or alternatively a measure, can draw multiple measures which are all displayed in respect of the identified dimension. The multiple measures can be displayed in a single or in multiple objects. Thus associations, dimensions or measures can be expanded.

Preferably, the method comprises the steps of: for a determined association, determining predefined combinations of preferred presentation objects, and for each combination, applying the related presentation properties to make a presentation of further data items by means of the preferred presentation objects. Thereby preferred presentation properties are applied to several presentation objects which are constituents in a preferred combination of the several objects.

In case several objects are used in relation to a given association, it is convenient that the method comprises the step of: at a first point in time, registering an application of a presentation object to an association to retrieve that object as a preferred presentation object for a determined association at a later point in time. Thereby e.g. a most frequently used object can be suggested in order to apply preferred presentation properties.

Preferably specific metadata that applies to the data item is bound to a given graphical element as determined by a framework of the report layout. This framework can be in the form of Hyper Text Markup Language, HTML, extensible Markup Language, XML, Hyperlinks or any other framework e.g. by means of object-oriented programming. In particular the framework can be comprised in a report generated by a Microsoft Reporting Services (TM) engine. This engine can render data reports from a special language which is an XML variant denoted Report Definition Language, RDL. These reports can thereby implement the present invention. Information for generating the framework can be comprised in the RDL language.

The values of the data items can be obtained by transmitting a request to a dataset or retrieved from the request itself. Measures or dimensions can be retrieved from the request or they can be validated as such in a database. However, typically the knowledge of a data item being either a measure or a dimension is stored with the dataset in a database.

When the data on which the data report or presentation originates from a large amount of data which multiple users demand to operate on, it is convenient to implement the method in a client server configuration. Thus the method can preferably comprise the further steps of:

from a client computer, sending a request for the data report to a web server; at the web server, processing the request and sending information to the client for it to render the data report;

in addition to determining the at least one association in response to a user's directed action, sending a request to the web server with the determined association for the web server to perform the search for a stored, like association related to stored presentation properties, and to retrieve the further data items; and from the web server, sending the further data items and the presentation properties to the client for it to apply the related presentation properties.

Additionally, the invention relates to a computer readable medium, a computer program product and a software application.

Generally, it should be noted that presentation properties can comprise all types of properties for a presentation. However, in the below presentation objects are considered a term which may be comprised by the presentation properties to handle groups of presentation properties by means of objects. Properties of such objects are denoted object properties and may also be comprised by the broad term presentation properties. Presentation objects can be considered as closely related to a graphical presentation. Thus for instance, an object can be of the type 'pie chart' or 'table' or 'bar chart' etc. However, presentation objects can also be defined in other ways without departing from the invention.

BRIEF DESCRIPTION OF THE DRAWING

The invention will be described in greater detail in connection with a preferred embodiment of the invention and with reference to the drawing in which.

DETAILED DESCRIPTION OF A PREFERRED EMBODIMENT

Generally and in connection with the present invention, it should be noted that a dimension is a collection of data of the same type; it allows one to structure a multidimensional database. A multidimensional database is typically defined as a database with at least three independent dimensions.

Measures are data structured by dimensions. In a measure, each cell of data is associated with one single position in a dimension.

The term OLAP designates a category of applications and technologies that allow the collection, storage, manipulation and reproduction of multidimensional data, with the goal of analysis.

Special modules may be provided to transform operational data from a source database or transaction database to analytical data in a data warehouse. In some situations it may be inconvenient to transform the operational data to analytical data which are stored in another database. Therefore the operational database, which is typically a relational database, can be emulated such that it is exposes an interface from which the operational database appears and is accessible as a multidimensional database.

In the below, the term database can designate any type of database whether analytical or transactional, but it should be clear that analytical databases are preferred in connection with the present invention.

Figure 1:
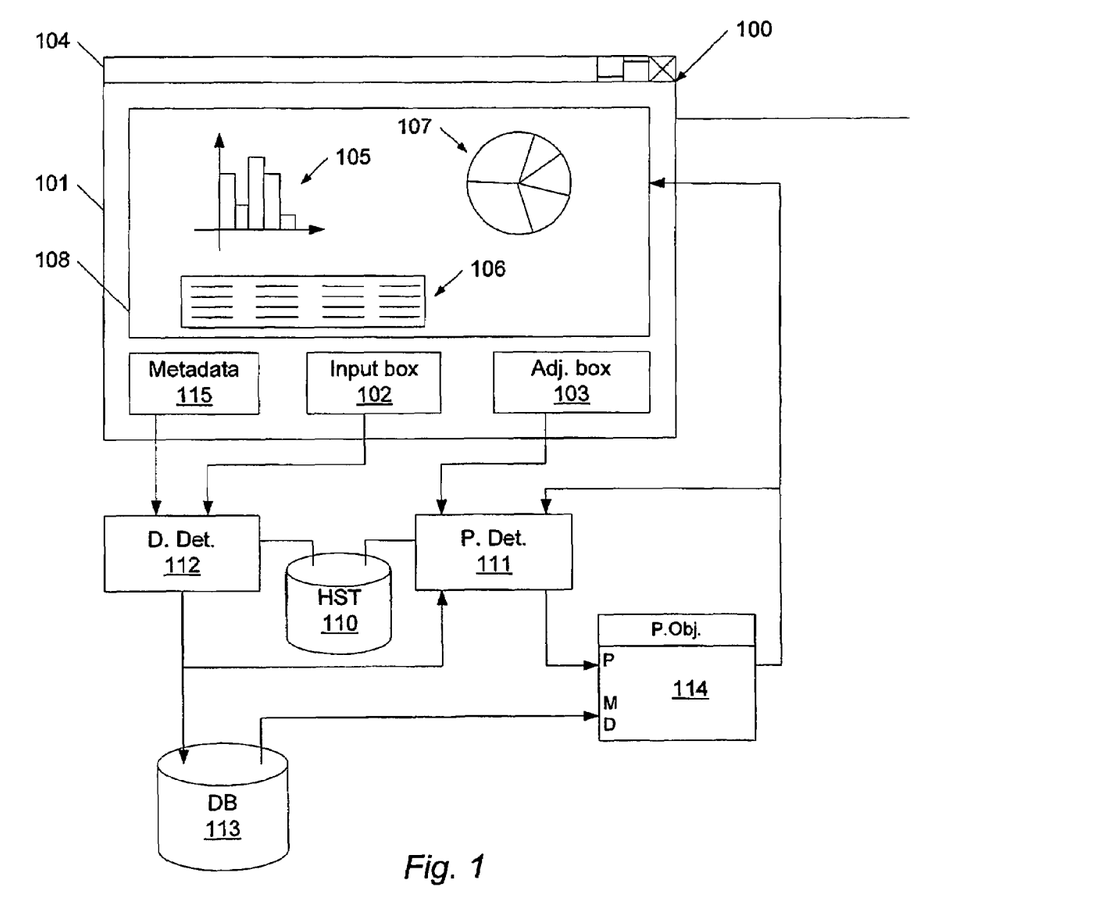
FIG. 1 shows a first block diagram of a system according to the invention.

FIG. 1 shows a first block diagram of a system according to the invention. The system 100 comprises a user interface 101 which operates in combination with a data determination component 112, a database 113, a presentation determination component 111, a storage memory 110, and a presentation memory object 114.

The user interface 101 is shown in the form of a window which has a control bar 104 with controls for closing, maximizing and minimizing the window. The window comprises controls in the form of an input text box 102, an adjustment box 103, and a data report 108 in which different graphical presentation objects (105,106,107) can be arranged. The data report can thus be arranged as a container of the presentation objects. Different presentation objects can be arranged in the container, e.g. a bar chart object 105, a pie chart object 107, and a list object 106.

The user interface can handle two types of situations. In a first situation, a user can request data to be presented as a result by means of the data report, whereas in a second situation a user can request further data by an action directed directly to a figure or element of the data report to thereby explore figures or elements of the result to obtain a further result.

In a preferred embodiment, a user can request data in the first situation by means of the input text box wherein the user can write a question in a natural language in a preferred language e.g. the English language. From a user's perspective this question constitutes a query to the database 113. In an exemplary embodiment the database 113 can contain the following data items, wherein the date items are categorized as measures or dimensions and wherein a dimension exists at different levels such as day, month, and year:

| Measures: | Dimensions: |
|---|---|
| 'turnover' | 'time' (level 0: Year; level 1: Month; level 2: Day) |
| 'cost' | 'Customer' (level 0: Group; level 1: Name) |
| | 'Product' (level 0: group; level 1: Name) |
| | 'Country' |

Thereby the following questions can be asked:
1) I would like to see 'cost' grouped by 'time, month'
2) I would like to see 'turnover' grouped by 'time, month', 'customer, group' and 'product, name'
3) I would like to see 'turnover'
4) I would like to see 'country'

A question like the above ones are forwarded to a data determination unit 112 which is arranged to identify data items and their category and levels by parsing the question.

In the second situation, wherein a user can request further data by an action directed directly to a figure or element of the data report, metadata applicable to the data item of the figure or element can be retrieved or deduced. In that situation, the data determination unit 112 is arranged to identify such metadata items.

Based on the identified data items, the data determination unit 112 is able to look up a storage memory 110 of previously used combinations of metadata and presentation properties. The contents of the storage memory 110 can have the following form as shown in table 1:

TABLE 1

| Data | Presentation | Frequency |
|---|---|---|
| Time, Level 1 Turnover | type = Barchart; legend = off; labels = off; 3D-effects = Orthogonal | 3 |
| Country; Contribution Margin | type = map; legend = off; labels = on; 3D-effects = None | 3 |
| Customer, Level 0; Turnover; Cost; Contribution Margin | Type = Crosstab; legend = off; labels = off; 3D-effects = None | 2 |
| ... | ... | ... |

By searching the storage memory 110, with contents as shown in table 1 above, for a match on the data items and levels identified from the question, it is possible to determine whether a previous presentation matching the question has been used. Thereby preferred presentation properties can be found. If for instance it is determined that a question involves the data item 'time, level 1' and 'turnover', it can be deduced that the preferred presentation of these data items is a bar chart with properties as shown in table 1 above. According to the invention a more detailed description of this deduction will be described in connection with the flowcharts.

Presentation properties are determined by the presentation determining unit 111 based on the result of the search for matching data items and levels. The determined presentation properties are stored in a presentation memory object 114.

The data determining unit 112 converts the question or the metadata, as the case may be, to a query that can be submitted to a database 113 via a database connection. In response to the query, the database provides a result data set. This result data set is sent to a presentation memory object 114. Thereby the result data set and the presentation properties are handled in the same memory object 114.

Via the presentation determining unit 111, the presentation properties from the data object or from the adjustment box 103 can be used for updating the frequency count and/or another update of the storage with the registered combinations of data and presentation properties in storage memory 110. The frequency count and/or another update of the storage can be updated in response to a user changing focus from the container 108 to the input box 102 and/or closing or minimizing the window 104. Alternatively, a button or other control (not shown) on the user interface 101 can be used as an acceptance of storing the presentation properties of the present presentation and/or update the frequency count. In the latter case, a more transparent update is provided.

Presence of controls and/or parameters in the adjustment box 103 can be regulated by registering a frequency of use for the individual controls. Thereby, e.g. the top 4 or 5 most used controls can be adapted to be directly available in a primary box, whereas access to additional less frequently used controls is provided in a secondary box.

In a preferred embodiment, the frequency of use for controls and/or parameters in the adjustment box 103 can be regulated by registering a frequency of use for the individual controls, which frequency of use is specific to the question or data items provided via the input box 102. Thereby, the controls available in a primary box are adapted to correspond both to the data on which the presentation is based and to a user's preferences.

Figure 2:
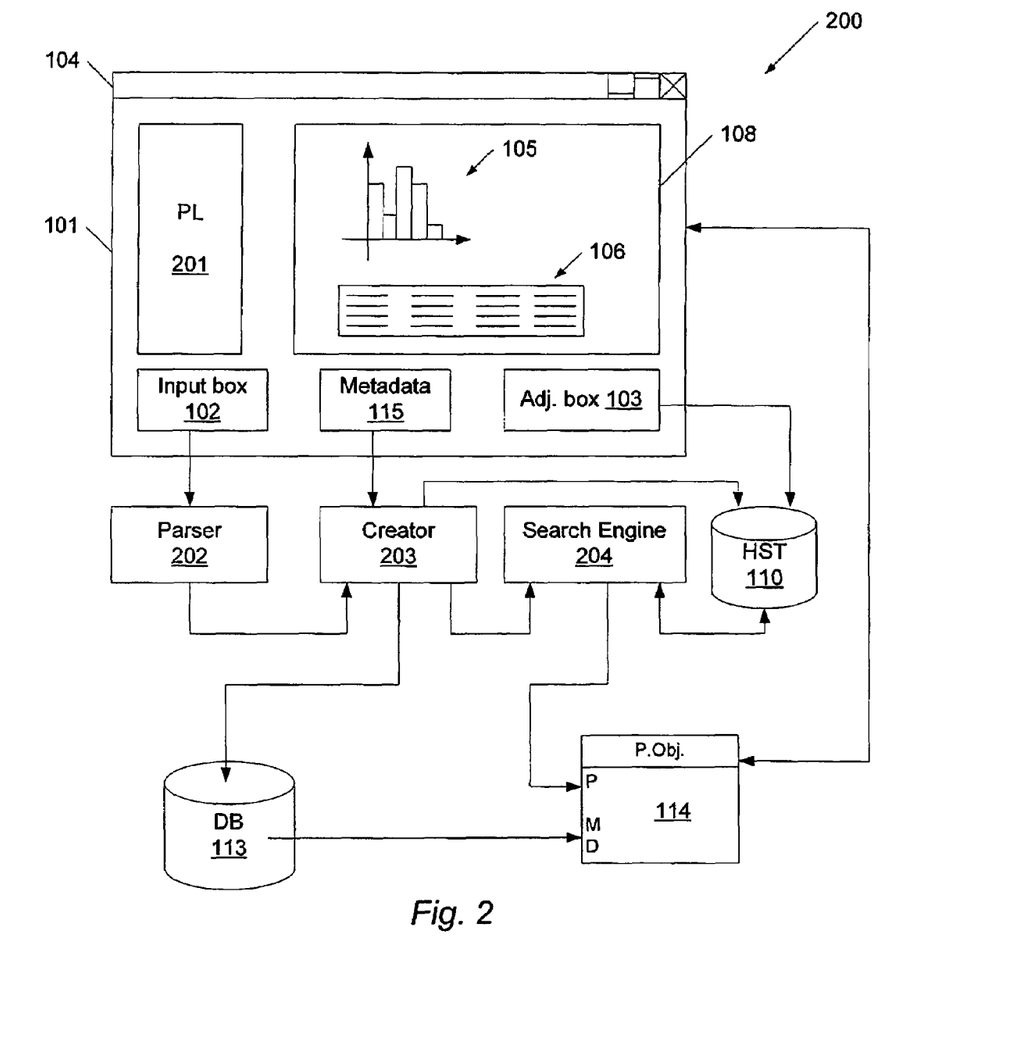
FIG. 2 shows a second block diagram of a system according to the invention.

FIG. 2 shows a second block diagram of a system according to the invention. The system 200 comprises the user interface 101 which operates in combination with a parser 202, the database 113, a creator 203, a search engine 204, the storage memory 110, and the presentation memory object 114.

The parser 202 is arranged to parse an input i.e. a question or query received by means of the input box 102 to identify data items, associations of data items and dimension levels and criteria, if any. Alternatively, when a user requests further data by an action directed directly to a figure or element of the data report, metadata applicable to the data item of the figure or element can be retrieved or deduced to be provided as identified items.

Based on the identified items, a creator 203 initiates several operations: sending a query to the database 113; creating an association of data items which association is forwarded to storage memory 110 for immediate or subsequent storage; and forwarding the association to a search engine that searches the storage memory 110 for previously stored like associations. By means of an adjustment box 103 on the user interface 101, presentation properties of a performed presentation is registered and stored in the storage memory 110 with a relation to the association that was used for retrieving the presented data i.e. the one forwarded to the storage memory.

In the shown embodiment, the user interface 101 comprises a pick-list 201 which can contain items that exist in the database. The items can be grouped by e.g. their category (measures or dimensions). A user entering a question in the input box 102 can pick a data item from the pick-list 201 to thereby uniquely identify a data item for a question. Thereby, the user is not required to remember data items of the database. The pick-list 201 can be provided with data items by manually entering them or by automatically retrieving existing data items in the database.

Figure 3:
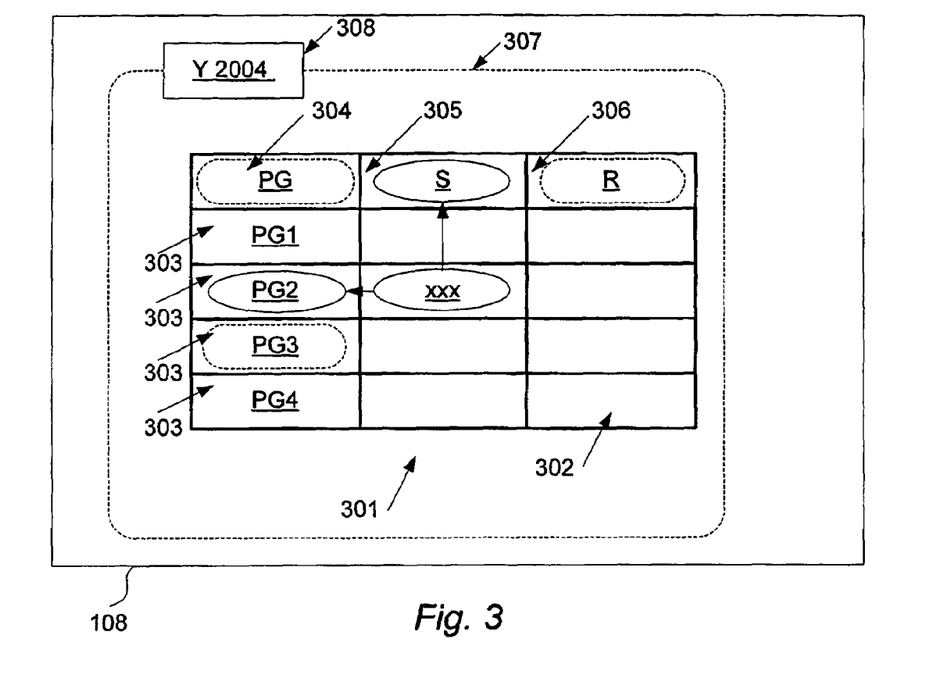
FIG. 3 shows a first graphical presentation object in a data report.

FIG. 3 shows a first graphical presentation object in a data report. The graphical presentation object is shown in the form of a table 301.

The table 301 can be comprised in an object container corresponding to the object container 108. This object container can constitute a data report or a portion of a data report. Alternatively, the table 301 can itself constitute a data report or a portion thereof.

A data report comprises a collection of graphical elements. Here, the graphical elements are organised in a presentation object in the form of the table 301. The graphical elements comprise cells of the table 302, in which it is shown that one of the cells comprises an exemplary figure 'xxx'. The cells of the table 301 are organised in rows and columns, where the cells 304, 305 and 306 contains column headers, and where cells 303 contain row headers. A further graphical element is an element 308 which is table header. The table header designates that a dimension value 'Y', which is short for 'Year', is equal to the dimension value '2004'. These graphical elements are thus contained in a collection in which each graphical element is bound to a data item.

The graphical element 305 is bound to a data item which provides the value of the column header, in this case the capital letter 'S' designates a measure denoted 'Sales'. Likewise, the graphical element 306 is bound to a data item which provides the value of a capital 'R' which also designates a measure, but denoted 'Revenue'. The information on 'R' or 'Revenue' or 'S' or 'Sales' need not be contained in the report itself, but can be provided by the database or any other application.

The graphical elements 303 are bound to data items which provide the value of the row headers. In this case, the values are given somewhat anonymous values: 'PG1', 'PG2', 'PG3' and 'PG4'. These values can be short for 'Product Group 1', 'Product Group 2' etc. In this case, the cells designate values of a dimension ie so-called 'dimension values'. The graphical element 304 is bound to a data item which provides a value 'PG' which is short for 'Product Group' and which designates the dimension of which the cells in the below column are dimension values.

The remaining eight cells designated in common by reference numeral 302 designates cells or graphical elements bound to data items which provides figures, typically numbers, as the result of a specified analysis.

The further graphical element 308, in the form of a table header is also bound to a data item, but proving a criterion which applies to the entire result as displayed in the table.

Each of the data items referred to above is specified by available metadata. This has the implication that the information that is required to request a specific data item is available. When the metadata comprises a dimension and/or a measure and/or a dimension value it is possible to retrieve information for generating or identifying an association which is related to preferred presentation properties. Especially, it is convenient when the specific metadata that applies to a given data item can be determined from a graphical element that illustrates a value of the data item to thereby provide a link from the graphical element, via metadata, to preferred presentation properties.

Expediently, the preferred presentation properties are retrieved in response to a user's directed action to the given graphical element. Thereby a very intuitive interface can be provided to the user. Thus, a user can target the graphical element that illustrates a figure to be explored according to his/her preferences. In the field of computer technology it is well known to provide a user with pointing devices for a user to make a directed action, eg a cursor controlled by a computer mouse, light pen or other pointing device.

As stated above, each of the data items referred to above is specified by available metadata. To be more specific, the metadata are assumed to be available, and the below will focus on deciding which metadata that are applicable to a given data item, to be able, firstly, to arrive from a graphical element to applicable metadata. It goes without saying that when some metadata are applicable others are not.

It is shown that the graphical element 308 designates that the dimension value 'Y', which is short for 'Year', is equal to the dimension value '2004'. A dimension value is a criterion. This criterion applies to the entire table. This is illustrated by a dashed line 307 and designates, on the one hand, that the table is within the scope of the metadata as specified in the data item bound to the graphical element 308 and, on the other hand, that there is a link from the graphical elements 302-306 to the metadata as specified in the data item.

For the graphical elements 304, 305 and 306 applicable metadata are the metadata of the data item to which the graphical elements are bound. The scope of the metadata is confined to the respective cells (304,305,306).

Likewise, for the elements designated in common by reference numeral 303 applicable metadata are the metadata of the data items to which the graphical elements are bound. The scope of the metadata is confined to the respective cells (303).

Metadata applicable to data items which are bound to graphical elements 302 are the metadata specified in a respective column header and row header. Thus, for the cell containing the exemplary figure 'xxx' the applicable metadata are specified in the data items bound to the graphical element 305 'S' and 303 'PG2'.

Consequently, the metadata applicable to exemplary figure 'xxx' are 'S' and 'PG2' for the year 2004.

The specific metadata that applies to the data item bound to a given graphical element can be determined by a framework of the report layout. Such a framework can provide the link from a graphical element to the data item containing the applicable metadata. The framework can be in accordance with HTML, Hyper Text Mark-up Language, different frameworks based on XML, eXtensible Mark-up Language, and/or based on parameterized hyperlinks. Alternatively, or additionally, other types of frameworks can be applied.

An example of a hyperlink from a data report where hyperlinks are used as a framework is:
http://AnalysisServer.com/Sales&ProductGroup=2&Year=2004

Here, 'http://' designates the Hyper Text Transfer Protocol for transmitting a request for a preferred presentation based on appended metadata. 'AnalysisServer.com' is an arbitrarily chosen IP address at which a server computer is requested to process the appended metadata in the form of parameters 'Sales&ProductGroup=2&Year=2004'. Individual parameters and their values are separated by the character '&'. Thus, the parameters are 'Sales', 'ProductGroup' and 'Year'. The respective values are: no value, '2', and '2004', respectively. At the server it can be deduced that 'Sales' is a measure, '2' is a dimension value since it can be deduced that 'ProductGroup' is a dimension, and '2004' is dimension value since 'Year' is a dimension. This deduction can be performed at the server computer by means of a mapping table.

Figure 4:
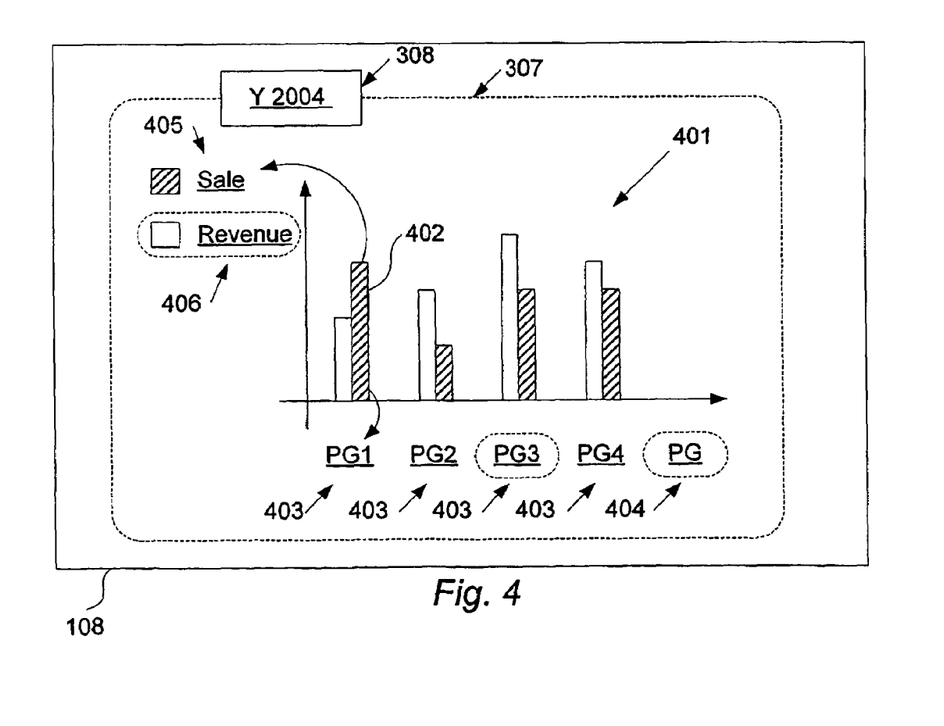
FIG. 4 shows a second graphical presentation object in a data report.

FIG. 4 shows a second graphical presentation object in a data report. This presentation object is in the form of a bar-chart wherein the two measures from the table in FIG. 3 ('Sales' and 'Revenue') are depicted by two different bar types (not filled and hatched bars).

The graphical presentation object comprises graphical elements in the form of eight individual bars like 402, tick labels 403, axis labels 404 and legend labels 405, 406. Each of these graphical elements is bound to a respective data item.

Like for the table in FIG. 3, it is here shown that the graphical element 308 designates that the dimension value 'Y', which is short for 'Year', is equal to the dimension value '2004'. Here, this criterion applies to the entire bar-chart. This is illustrated by dashed line 307 and designates, on the one hand, that the table is within the scope of the metadata as specified in the data item bound to the graphical element 308 and, on the other hand, that there is a link from the graphical elements 402-406 to the metadata as specified in the data item.

For the graphical elements designated in common by reference numeral 403, i.e. the tick labels, the applicable metadata are the metadata of the data item to which the graphical elements are bound. Graphically, the scope can be confined to a text label of the tick labels or another graphical area that is intuitively connected to the tick labels.

For the graphical elements designated in common by reference numeral 407, i.e. the bars, the applicable metadata specified the data items of the tick labels 403 and the legend text 405, 406 in combination. For example for the hatched bar 402, the applicable metadata are the tick label 403 'PG1' for ProductGroup equal to 1 in combination with the text legend 405 'S' for 'Sale'.

Also for this presentation object it should be noted that the specific metadata that applies to the data item bound to a given graphical element can be determined by a framework of the report layout. Such a framework can provide the link from a graphical element to the data item containing the applicable metadata. The framework can be in accordance with HTML, Hyper Text Mark-up Language, different frameworks based on XML, extensible Mark-up Language, and/or based on parameterized hyperlinks. Alternatively, or additionally, other types of frameworks can be applied.

Thus, in response to a user's directed action to a given graphical element that represents a figure, dimension or measure he/she wishes to explore further, metadata applicable to the specific element can be deduced or retrieved. Thus a link from the graphical element to applicable metadata is provided.

To complete the link to preferred presentation properties a link from the applicable metadata to the preferred presentation properties is provided. This is described in the following.

Figure 5:
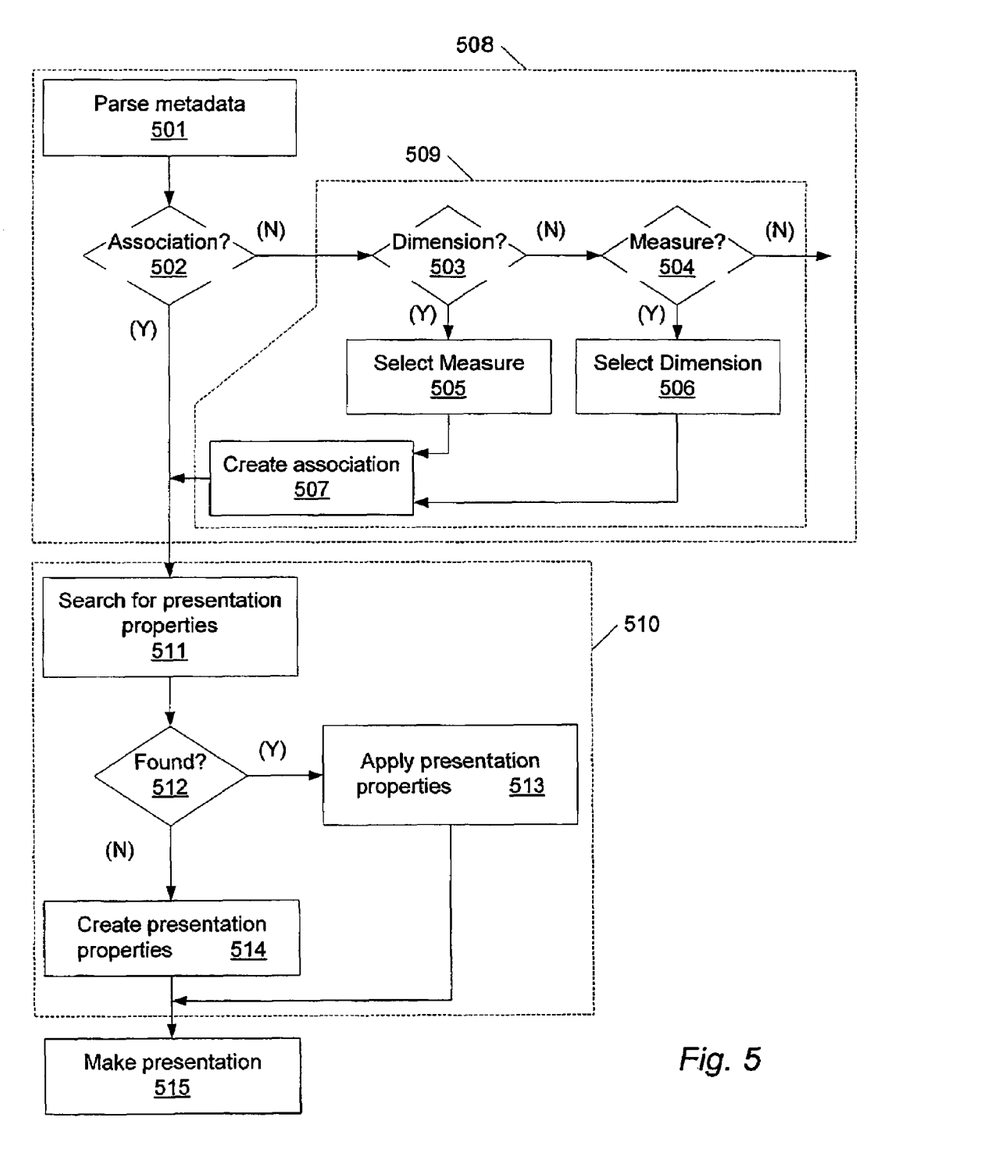
FIG. 5 shows a flowchart of a method according to the invention of determining an association and determining a presentation.

FIG. 5 shows a flowchart of a method according to the invention of determining an association and determining a presentation. The flowchart is divided into a data determining section 508, a presentation determining section 510 and a step 515 of making a presentation based on determined data and presentation properties. In the data determining section 508, a first step 501 is to parse a representation of input metadata. This step comprises identifying data items and their category and associations of data items, if any. Optionally, the step 501 can comprise identifying dimension levels; criteria, if any; and combinations of associations. In subsequent step 502 it is determined whether any associations were identified. In the positive event (Y) it can prima facia be deduced that sufficient data were present in the question and that a search for presentation properties can be initiated in step 511. In the negative event (N) however, it can be deduced no association is found in the representation of the input metadata and according to the invention the method continues in section 509 of the flowchart to create an association. In section 509 it is examined in step 503 whether an identified data item is of the dimensions type. In the positive event (Y) of step 503 a data item of the measures type is selected in step 505. In the negative event (N) of step 503 it is examined in step 504 whether an identified data item is of the measures type; and in the positive event (Y) thereof a data item of the dimensions type is selected in step 506. In case no measure is identified, and consequently no dimension is identified, it can be deduced that the input metadata has not even incomplete information, but is lacking information. In this case the situation can be handled by prompting the user to enter valid input metadata with at least one data item or alternatively by applying the most frequently used metadata and therewith applied presentation properties.

In steps 505 and step 506 a previously used association, if any, involving the identified data item may be detected. However, in the event no previously used association involving the data item is found, a most frequently used data item can be selected or all data items of the respective type can be selected. An association based on the identified data items and determined data items is created in step 507. This step can involve creating a memory object for each data item of the dimensions type.

If a data item of the measures type or dimensions type has been selected in either step 505 or step 506, respectively, a search for presentation properties can in a storage memory be initiated in step 511. In step 512 it is examined whether a previously used presentation is found. In the positive event (Y) presentation properties of a previously stored, like association is found, the presentation properties are applied in step 513 to make a presentation of the data specified by the association in step 515. Alternatively (N), if no like association is found, presentation properties are created either by selecting the association that is most like an existing association and/or by using an expert system. Consequently, even a question with incomplete data identification can lead to retrieval and application of preferred presentation properties to make a presentation.

In a preferred embodiment, the method according to the invention can simply parse the input metadata to identify associations, and subsequently proceed directly to step 511 to search for presentation properties. Thereby, presentation properties can be retrieved based on associations identified in the input metadata. Thus the steps 502 and steps in section 509 can be omitted while the method is in accordance with the invention.

Thus in accordance with the invention, a dimension or measure as the case may be can be selected to create a complete association. However, in accordance with another aspect of the invention an identified association, dimension or measure can be expanded to multiple associations.

The expanding can be based on user preferences. User preferences can be determined by maintaining a list of combinations of associations that are used concurrently or in the same data report. Thus, when an association is determined it can be expanded by looking up other associations which have previously been used in combination with the identified association. Alternatively, the list can include a number which for an identified association reflects the likelihood that a user will apply another identified association. This number can be a relative or absolute number of times the identified association has previously been used in combination with the other identified association. Thus, when an association is determined it can be expanded by looking up other associations which, with a given likelihood, have been used in combination with the identified association. For instance, the given likelihood can be expressed as a threshold value of e.g. 50%; for an association A1 it is stated that in 10% of its uses association A2 is also used, whereas in 90% of its uses association A3 is also used. Thus it can be deduced that A1 should be expanded to be combined with A3.

When a measure is identified, firstly, a complete association is created by selecting a dimension. Secondly, this created association can be expanded as set forth above. This also applies to dimensions.

The aspect of expanding an association from an identified association and/or measure and/or dimension can be embodied as an individual step between section 508 and 510. Alternatively, the aspect can be embodied by means of section 510. In any event, when an association is expanded presentation properties is to be applied to make a presentation of the multiple associations obtained by expanding an identified association.

It should be noted that step 502 can be applied iteratively to identify multiple associations and/or measures and/or dimensions in the metadata.

Figure 6:
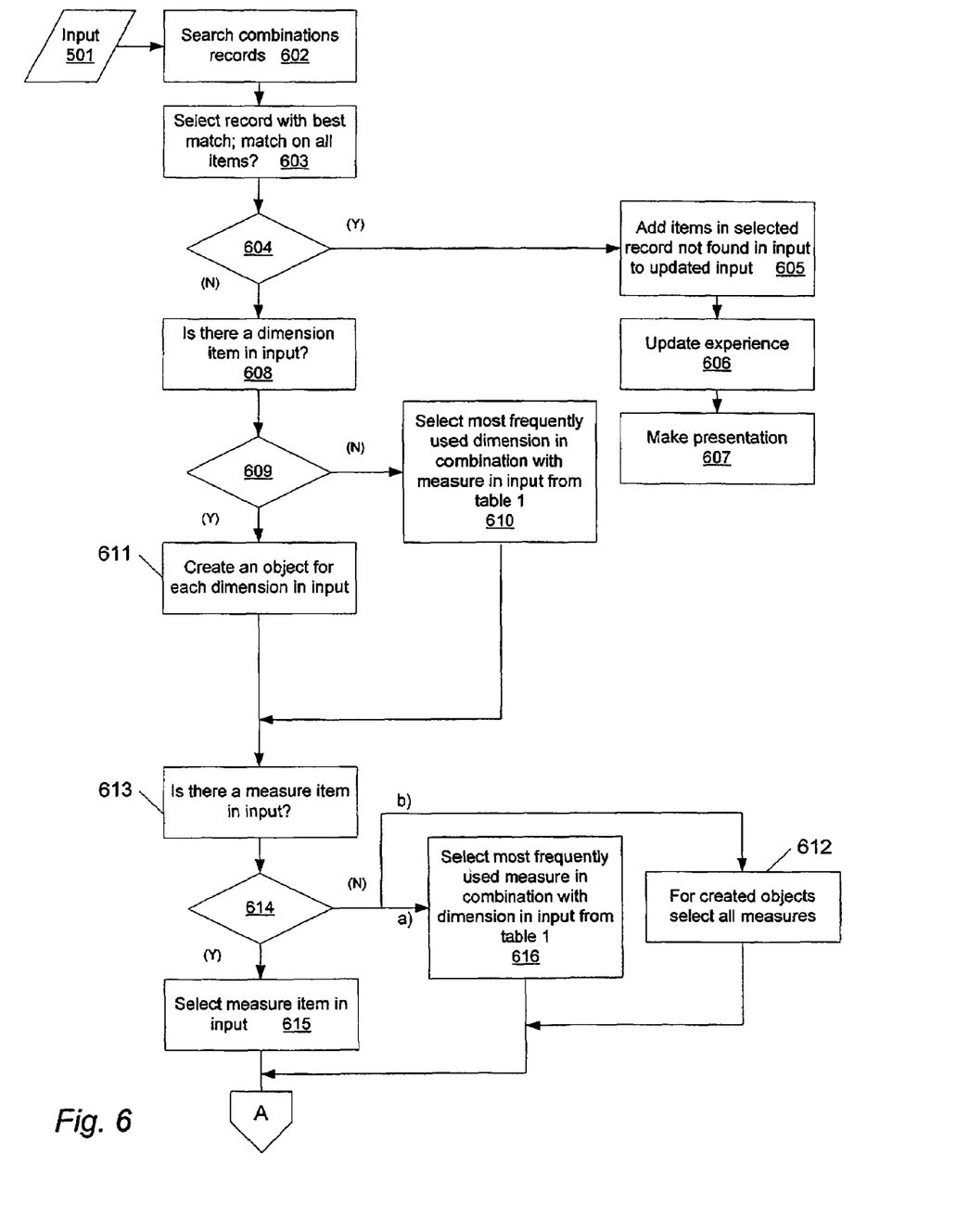
FIG. 6 shows a flowchart of a method according to the invention of determining an association.

FIG. 6 shows a flowchart of a method according to the invention of determining an association. This flowchart is an alternative and more detailed illustration of the process of determining data. Based on input metadata 601, a storage memory of combinations of presentation objects is searched to find presentation properties for previously used combinations of presentation objects; e.g. a combination of a pie chart and a bar chart object. The contents of the storage memory of combinations of objects can have the below exemplary form:

TABLE 2

| Combination | Frequency |
|---|---|
| Object1 = (Time Level 1; Turnover);<br>Object2 = (Country; Contribution Margin);<br>Object3 = (Customer Level 0; Turnover; Cost; Contribution Margin);<br>Criteria = (Time Level 1 = 2003 January) | 3 |
| Object1 = (Time Level 0; Contribution Margin);<br>Object2 = (Customer Level 0; Turnover; Cost; Contribution Margin);<br>Criteria = (Country = "United States"; Time Level 0 = 2003) | 2 |
| Object1 = (Time Level 2; Turnover); | 3 |
| ... | ... |

Alternatively, this can be represented in XML format as shown below for the first record in table 2:

```
<object name="object1">
    <dimension name="Time Level 1"/>
    <measure name="Turnover"/>
</object>
<object name="Object2">
    <dimension name="Country"/>
    <measure name="Contribution Margin"/>
</object>
<object name="Object3">
    <dimension name="Customer Level 0"/>
    <measure name="Turnover"/>
    <measure name="Cost"/>
    <measure name="Contribution Margin"/>
</object>
<object name="Criteria">
    <dimension name="Time Level 1"/>
    <value name="2003 January"/>
</object>
```

As a result of the search, the record that is determined to have the best match with a record is selected temporarily and it is examined whether the temporarily selected record matches all items identified in the question. In case there is a match on all items (Y) it is determined in step 604 to continue to step 605, wherein properties of the temporarily selected record is applied to make a presentation in step 607. Before or after making the presentation in step 607, the frequency of use of the selected presentation is updated.

In case there is not a match on all items (N) it is determined in step 604 to continue to step 608, wherein it is examined whether a data item of the dimensions type was identified. Preferably, step 608 comprises selecting one, preferably a first, of several associations, if there are several associations. However, according to the invention, the method can resume at this step, in which case a next association is selected. In the positive event (Y) of step 608, an object for each identified dimension is created. This is based on the assumption that each dimension is to be presented by an individual object. In the event (N) that no dimension can be identified, the most frequently used dimension in association with an identified measure, if any, is selected. Thereby, if for instance a data item 'sale' is identified the method can select e.g. the data item 'time' if this is the most frequently used data item in association with 'sale'. Subsequently, an object for the selected data item of the dimensions type is created.

Preferably, the method continues to step 613 in which it is examined whether a data item of the measures type is identified. If, in step 614, it is decided that a measure item is identified (Y) the identified measure item is selected; alternatively (N) the most frequently used measure in association with the identified dimension is selected.

At this stage of the method, identified by the downward arrow with capital 'A', data items are selected and presentation objects have been created. If several associations are identified, the method can resume at step 608. Alternatively, the method can continue despite there are several associations to resume at step 608 from a later step.

It should be noted that table 2 above can be used for expanding the presentation of an association. In case a single association, measure or dimension is found an association can be determined as described above. Based on the determined association, presentation properties are applied to make a presentation of the association. However, in case an expansion is desired, a search for presentation properties of a given association can be expanded by applying presentation properties of a record in table 2 in which the given association is a constituent in a combination of multiple associations. This will typically require that data are requested according to the combination of multiple associations. Thereby, metadata yielding a presentation of the measure 'Sale' can in a first instance be associated with the dimension 'ProductGroup' and in a second instance be expanded to be combined with an association of 'Sale' and 'Time'. These two associations can be presented by means of two different objects eg a pie-chart object and a bar-chart object.

Figure 7:
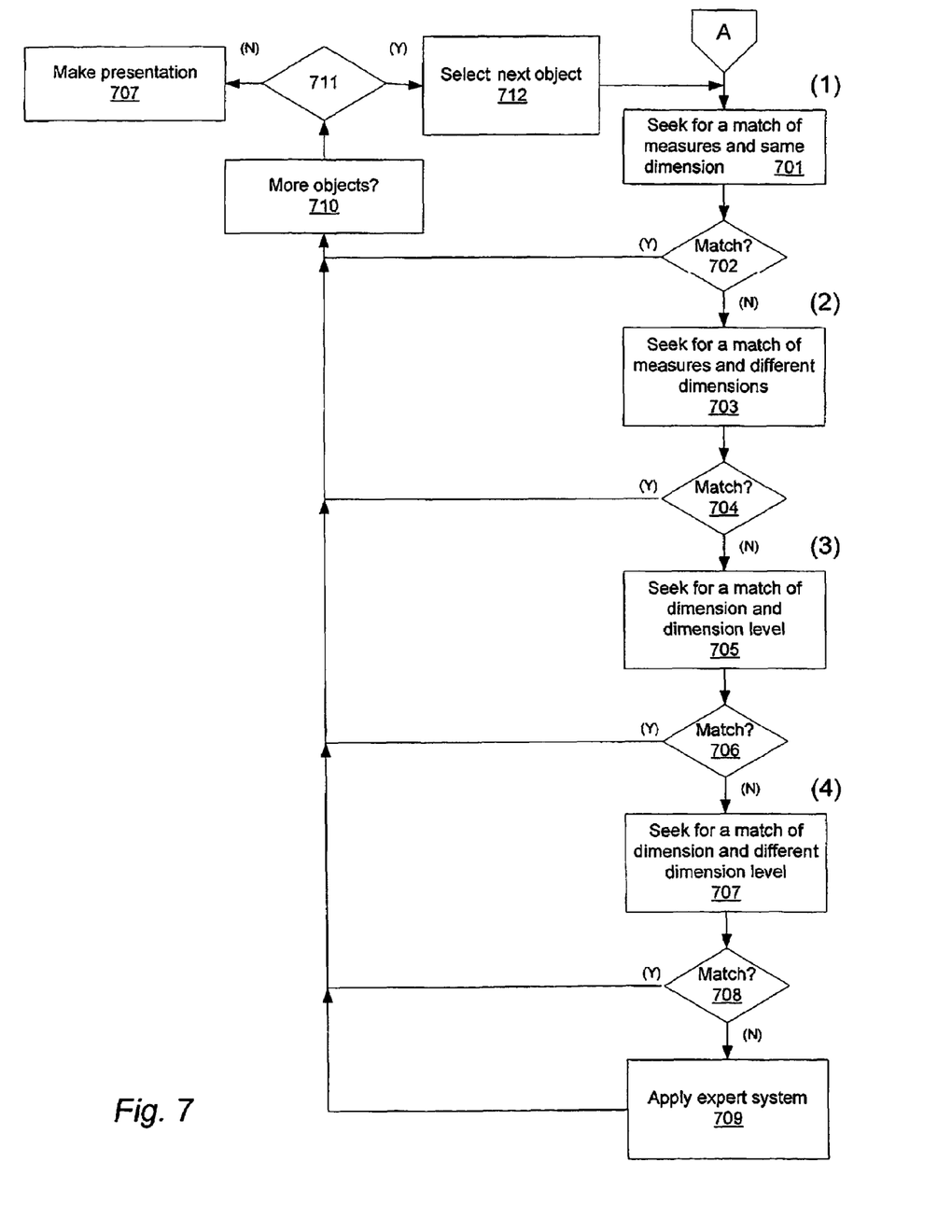
FIG. 7 shows a flowchart of a method according to the invention of determining a presentation.

FIG. 7 shows a flowchart of a method according to the invention of determining a presentation. The flowchart is entered at a stage identified by the downward arrow with capital 'A'. At this stage, data items are selected to form an association and presentation objects have been created. Thus, according to invention, presentation properties for a determined association can be determined by searching a storage for presentation properties of a previously stored, like association. In the event presentation properties of a previously stored, like association is found, the presentation properties can be applied to make a presentation of the data specified by the association.

At a first level of a layered search for presentation properties, the method comprises a step 701 of seeking a match of all data items of an association; and if a match is found (Y), step 702 directs the method to a next object. Alternatively (N), if no match is found, step 702 directs the method to a second level at which the method comprises a step 703 of seeking a match of an identified data item of the measures type only. Thereby, an associated data item of the dimensions type can be different from the identified data item of the dimensions type. If a match is found (Y), step 704 redirects the method to a next object. Alternatively (N), if no match is found, step 704 directs the method to a third level at which the method comprises a step 705 of seeking a match of data items of the dimensions type at same dimensions levels—for instance 'time, month' may match, whereas 'time, day' will consequently not match. In the positive event, a match is found; step 706 directs the method to a next object. In the negative event, a match is not found; step 706 directs the method to a fourth level. At this fourth level the method comprises a step 707 of seeking a match of an identified data item of the dimensions type only. Thus, allowing the dimension level to be different. If a match is found (Y), step 708 redirects the method to a next object. Alternatively, it is deduced that no like presentation has been recorded and an expert system is applied in step 709 to select presentation properties based on e.g. constraints of the medium on which the presentation is to be produced and/or based on the structure and/or format of the data to be presented. The method is redirected to a next object from steps 702, or 704, or 706, or 708, or 709 via steps 710, 711 and 712. In case step 708 is resumed from a stage corresponding to transition 'A', step 712 of selecting a next object leads to step 701 if more objects were identified in step 710. Alternatively, if the method is not arranged to resume at step 708 from a stage corresponding to transition 'A', step 712 of selecting a next object is omitted and the flow is resumed at step 708 from step 711 in positive events (Y).

Thereby, a layered search is provided for resembling presentation properties that, to a largest possible extent, conform to a user's recorded preferences.

The expert system can be illustrated by pseudo-code of the following form, where BEGIN and END statements enclose the pseudo-code:

```
BEGIN
    If dimension is a time-dimension then
        Type=barchart, legend=off; labels=off; 3D
        effects=Orthogonal
    Else if one measure then
        Type=piechart, legend=on; labels=on; 3D-
        effects=Orthogonal
    Else
        Type=crosstab, legend=off; labels=off; 3D-
        effects=none
    Retrieve data from database
    If Type=piechart and number of dimension members is > 10 then
        Type=crosstab, legend=off; labels=off; 3D-
        effects=none
    If type not map and all dimension members are defined on map
    then
        Type=map, legend=off; labels=on; 3D-effects=none
    If labels overlapping then
        Labels=off
END
```

After the statement 'Retrieve data from database' it is possible to involve the structure and format of data to make decisions by means of the expert system.

The expert system can be a type using linear logic programming, fuzzy logic, neural values, neural networks or of any another type. Thus, the expert system can be implemented in various other ways than shown above.

To explain multidimensional databases, measures, dimensions, and levels one can imagine a spreadsheet whose rows represent products and columns represent months; these constitute two dimensions. In continuation thereof, it is possible to stack additional sheets (one for each sales office, say) that also have product and month rows. "Sales offices" thus becomes the third dimension.

A multidimensional database can contain multiple dimensions, representing, for example, different scenarios (e.g., budget versus actual) or customer categories. The data item to be measured across these dimensions is called a measure. In the above description of a preferred embodiment, e.g. 'sales' is a measure. A multidimensional database can have multiple measures. For example, it is possible to track both monetary income and units sold across the various dimensions. If a dimension consists of units that can be broken down into smaller units or grouped into larger ones, the relationship between unit levels is known as a hierarchy or simply 'levels'. Typical hierarchies are years broken down into levels of quarters and months, or sales offices grouped into regions. Many OLAP applications assign a single unit at the top hierarchical level of each dimension to represent the total for the entire dimension. Analysis tools then allow you to drill down into greater detail—for example, beginning with sales for the entire company, then by region, then by sales offices, and, finally, by individual salespersons.

"Meta-data" is descriptions of data items and can range from simple field names or table names to more advanced descriptions of the data comprising e.g. description of processes generating the data.

With regard to FIG. 4 it should be emphasized that the determination of presentation properties can be considered as comprising a layered search (1,2,3,4) for presentation properties. The layered search can comprise a first level (1) with a search for a match of measures and same dimensions. It can comprise a second level (2) with a search for a match of measures and different dimensions. It can comprise a third level (3,4) with a search for a match of dimension at primarily same level of dimension or secondarily at a different level of dimension. And it can comprise a final step of applying an expert system, arranged to determine and apply presentation properties, in the event no like association is found.

The invention claimed is:

1. A computer-implemented method of preparing a presentation requested from a data report; the method comprising the steps of:
   displaying a first data report which contains at least one graphical element linked to a first data item specified by metadata, said metadata comprising a dimension or a dimension value and a measure, wherein the first data item is categorized as the dimension or dimension value or the measure;
   in response to a user's action of selecting the graphical element, automatically generating and presenting, to the user, an analysis of data represented by the graphical element including:
   determining the metadata of the first data item linked to the graphical element and at least one association of the dimension and measure of the determined metadata, wherein the association of the first data item dimension and measure specifies a set of data;
   retrieving, from a storage memory, a stored association comparable to the determined association, the stored association being related to presentation properties so as to provide stored presentation properties that
   (i) describe different presentations with different collections of graphical elements, and
   (ii) relate to an association in such a way that individual instances of associations relate to different instances of presentation properties;
   generating a second data report by applying the presentation properties, related to the stored association, to second data items specified by the stored association; and
   displaying, to the user, the second data report.

2. A method according to claim 1, wherein the step of displaying a second data report comprises a step of:
   displaying a report confined to a subset of the second data items, which subset is specified by the determined association and a dimension value in the applicable metadata.

3. A method according to claim 1, wherein the second data items are additionally specified by a dimension value; and wherein the presentation properties are divided into a first group and a second group; and wherein properties of the first group are applied to the second data items as specified by the determined association; and wherein properties of the second group are applied to a subset of the second data items as further specified by a dimension value of the applicable metadata.

4. A method according to claim 1, wherein the step of searching for a stored association comprises the steps of:
   in case a stored association is not found, generating presentation properties; and
   relating the generated presentation properties to the determined association.

5. A method according to claim 1, wherein the first data report is configured with a tool providing a user with controls for manipulating presentation properties according to either one of the following steps in response to a user's action;
  selecting a presentation object from a collection of presentation objects and selecting graphical properties of the selected presentation object; or
  changing an applied presentation object and/or selecting graphical properties of the applied presentation object.

6. A method according to claim 1, wherein the step of searching for a stored association comprises:
  determining whether an identified measure or dimension or association thereof can be deemed to be incomplete, and in that event searching for stored, like metadata with associated presentation properties, in which the deemed incomplete metadata are contained.

7. A method according to claim 6, wherein the step of searching for stored, like metadata comprises:
  determining whether the determined association can be deemed to be different from stored associations, and in that event searching for a stored association with related presentation properties, in which a measure or dimension of the determined association is contained; and applying the presentation properties related to the stored association, which contains the dimension or the measure, to make the presentation.

8. A method according to claim 1, comprising the step of:
  determining multiple associations based on retrieving associations wherein a dimension identified in the applicable metadata is a constituent to thereby discover multiple measures which each forms an association in combination with the identified dimension.

9. A method according to claim 1, comprising the steps of:
  for a determined association, determining predefined combinations of preferred presentation objects, and
  for each combination, applying the related presentation properties to make a presentation of further data items by means of the preferred presentation objects.

10. A method according to claim 1, comprising the step of:
  at a first point in time, registering an application of a presentation object to an association to retrieve that object as a preferred presentation object for a determined association at a later point in time.

11. A method according to claim 1, comprising the steps of:
  registering a count of application of a presentation object to a given association;
  applying a presentation object with a relatively high count as a preferred presentation object.

12. A method according to claim 1, wherein specific metadata that applies to the data item bound to a given graphical element is determined by a framework of the report layout.

13. A method according to claim 1, wherein values of the data items are obtained by transmitting a request to a dataset or retrieved from the request itself.

14. A method according to claim 1, comprising the further steps of:
  from a client computer, sending a request for the second data report to a web server;
  at the web server, processing the request and sending information to the client for it to render the second data report;
  in addition to determining the association in response to a user's directed action, sending a request to the web server with the association for the web server to perform the search for a stored, like association related to stored presentation properties, and to retrieve the second data items; and
  from the web server, sending the second data items and the presentation properties to the client for it to apply the obtained presentation properties.

15. A computer-readable data recording device encoded with a program which, when run on a computer, executes the method comprising:
  displaying a first data report which contains at least one graphical element bound to a first data item specified by metadata, said metadata comprising a dimension or a dimension value and a measure, wherein the first data item is categorized as the dimension or dimension value or the measure;
  in response to a user's action of selecting the graphical element, automatically generating and presenting, to the user, an analysis of data represented by the graphical element including:
  determining the metadata of the first data item bound to the graphical element and at least one association of the dimension and measure of the determined metadata, wherein the association of the first data item dimension and measure specifies a set of data;
  retrieving, from a storage memory, a stored association comparable to the determined association, the stored association being related to presentation properties so as to provide stored presentation properties that
    (i) describe different presentations with different collections of graphical elements, and
    (ii) relate to an association in such a way that individual instances of associations relate to different instances of presentation properties;
  generating a second data report by applying the presentation properties, related to the stored association, to second data items specified by the stored association; and
  displaying, to the user, the second data report.

16. A method according to claim 15, wherein the operations of determining of at least one association and searching for a stored matching association are integrated in a first individual software application.

17. A method according to claim 16, wherein the operations of displaying the second data report and applying the presentation properties are integrated in a second individual software application.

18. A method according to claim 15, wherein the method is implemented as client software and server software which interoperate when run on a client and a server computer, respectively, by: from the client computer, sending a request for the data report to the server computer; at the server computer, processing the request and sending information to the client computer for it to render the data report; in addition to determining the at least one association in response to a user's directed action, sending a request to the server computer with the determined association for the server computer to perform the search for a stored matching association related to stored presentation properties, and to retrieve the second data items; and from the server computer, sending the second data items and the presentation properties to the client computer for it to apply the related presentation properties.

* * * * *